(12) United States Patent
Ruiz Ortega et al.

(10) Patent No.: US 12,391,172 B2
(45) Date of Patent: Aug. 19, 2025

(54) BLIND SPOT INDICATOR ASSEMBLY FOR A MOTOR VEHICLE AND REAR-VIEW MIRROR COMPRISING SAID BLIND SPOT INDICATOR ASSEMBLY

(71) Applicant: FicoMirrors, S.A.U., Barcelona (ES)

(72) Inventors: Néstor Ruiz Ortega, Viladecavalls (ES); María Luisa Novella Requena, Viladecavalls (ES)

(73) Assignee: FICOMIRRORS, S.A.U., Barcelona (ES)

( * ) Notice: Subject to any disclaimer, the term of this patent is extended or adjusted under 35 U.S.C. 154(b) by 0 days.

(21) Appl. No.: 18/545,503

(22) Filed: Dec. 19, 2023

(65) Prior Publication Data

US 2024/0208402 A1 Jun. 27, 2024

(30) Foreign Application Priority Data

Dec. 22, 2022 (EP) ..................................... 22383265

(51) Int. Cl.
*B60Q 1/26* (2006.01)
*B60Q 1/50* (2006.01)
*B60Q 9/00* (2006.01)
*B60R 1/12* (2006.01)

(52) U.S. Cl.
CPC ............ *B60Q 1/2665* (2013.01); *B60Q 1/50* (2013.01); *B60Q 9/008* (2013.01); *B60R 1/1207* (2013.01)

(58) Field of Classification Search
CPC ........ B60Q 1/2665; B60Q 1/50; B60Q 9/008; B60R 1/1207; F21S 43/14; F21S 43/26; F21S 43/40; F21V 5/00; F21V 5/04; F21V 7/00; F21V 13/00
See application file for complete search history.

(56) References Cited

U.S. PATENT DOCUMENTS

| 7,771,062 | B2 | 8/2010 | Kuhn et al. |
| 8,599,037 | B2 | 12/2013 | Takayanagi |
| 9,663,027 | B2 | 5/2017 | Hellin Navarro et al. |
| 2008/0225417 | A1* | 9/2008 | Kuhn .................. B60Q 1/2665 359/839 |
| 2009/0115631 | A1 | 5/2009 | Foote et al. |

(Continued)

FOREIGN PATENT DOCUMENTS

| CN | 207750929 U | 8/2018 |
| CN | 209938436 U | 1/2020 |

(Continued)

OTHER PUBLICATIONS

European Application No. 22383265.0 filed Dec. 22, 2022; Extended European Search Report dated May 11, 2023; 14 pages.

*Primary Examiner* — James R Greece
*Assistant Examiner* — Jose M Diaz
(74) *Attorney, Agent, or Firm* — CANTOR COLBURN LLP

(57) ABSTRACT

A blind spot indicator assembly (100) for a motor vehicle is disclosed comprising a housing (110), at least one light source (200) to project light along a first direction (D1), a light control film (300) inclined at an angle (α1) to a lens assembly (400) to receive light from the light source (200). The lens assembly (400) has a light-receiving portion (450) to receive light from the light control film (300). A rear-view mirror is also disclosed comprising a blind spot indicator assembly (100).

14 Claims, 5 Drawing Sheets

(56) References Cited

U.S. PATENT DOCUMENTS

| | | | |
|---|---|---|---|
| 2012/0206930 A1 | 8/2012 | Minikey, Jr. et al. | |
| 2016/0046239 A1 | 2/2016 | Mathieu et al. | |
| 2020/0135031 A1 | 4/2020 | Kendall et al. | |
| 2020/0355340 A1 | 11/2020 | Wu et al. | |
| 2023/0311765 A1* | 10/2023 | Galdys | H04N 7/181 |
| | | | 348/148 |

FOREIGN PATENT DOCUMENTS

| | | |
|---|---|---|
| DE | 102012000582 A1 | 9/2012 |
| EP | 1970736 A1 | 9/2008 |
| EP | 3904159 A1 | 11/2021 |
| EP | 4094989 A1 | 11/2022 |

\* cited by examiner

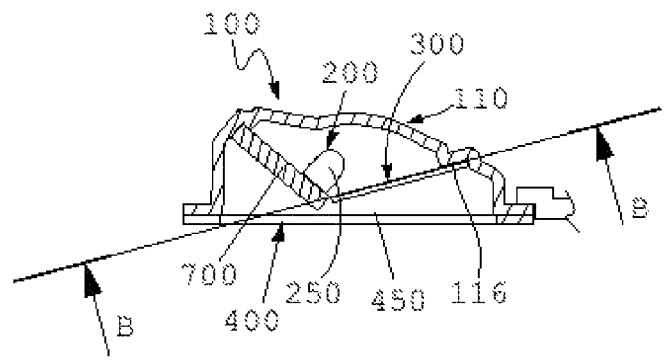
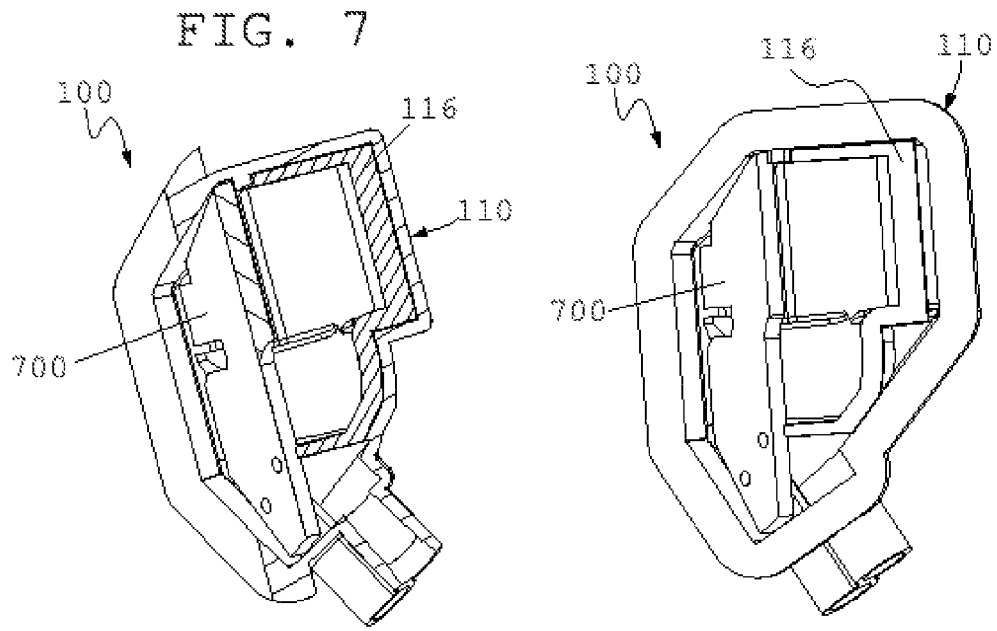

BLIND SPOT INDICATOR ASSEMBLY FOR A MOTOR VEHICLE AND REAR-VIEW MIRROR COMPRISING SAID BLIND SPOT INDICATOR ASSEMBLY

CROSS-REFERENCE TO RELATED APPLICATIONS

This application claims the benefit of European Application Serial No. 22383265.0 filed Dec. 22, 2022, the disclosure of which is incorporated herein by reference in its entirety.

BACKGROUND

The present disclosure relates to indicator assemblies intended to warn a motor vehicle driver that an object, such as another vehicle, is within a blind spot or blind area.

A blind spot or area is a lateral zone near the motor vehicle where the driver has no suitable vision when looking in the rear-view mirrors.

Blind spot indicators are known based on sensors and optical elements that identify when objects enter a blind spot or zone that are capable of alerting the driver that the blind spot is now being occupied by an object, such as for example a vehicle in the adjacent lane.

One example of a rear-view mirror assembly having a blind spot indicator for motor vehicles is disclosed in U.S. Pat. No. 9,663,027 filed in the name of the same applicant of the present application. The rear-view mirror assembly comprises a reflective element attached to a clamping plate, and a watertight illumination module attached to the reflective element. A printed circuit board is arranged in an inner cavity of the watertight illumination at an angle to the clamping plate. At least one light emitting diode is provided on the printed circuit board. A protective case for the watertight illumination module has a metalized and textured surface in its interior. A first side of the printed circuit board rests on the watertight illumination module and a second side opposite the first side does not rest on the watertight illumination module, with the printed circuit board. The light emitted by the light emitting diodes bounces on the metalized surface of the protective case emitting light indirectly passing through the surface of the reflecting element through its opening.

Although blind spot indicators enhance driving safety, it has been found that a problem exists that illumination is partially directed on directions different from the driver. Thus, there still remains a need for blind spot indicators in which the illumination on users different from the driver can be efficiently avoided with reduced costs.

SUMMARY

The present disclosure provides a blind spot indicator assembly for a motor vehicle for warning of the presence of another vehicle or object in the vicinity. The present blind spot indicator assembly has been found to address the above issues in prior art devices while, at the same time, provides further significant advantages.

The present blind spot indicator assembly may be, for example, a visual indicator to show the driver that another vehicle or object has been detected. The present disclosure further relates to a rear-view minor assembly for motor vehicles including such blind spot indicator assembly.

The blind spot indicator assembly for motor vehicles disclosed herein comprises a housing and at least one light source arranged to project light along a first predetermined direction. The light source may include at least one light emitting diode. The light source may be attached to a light source attaching portion within the housing.

The blind spot indicator assembly further includes a light control film with at least one surface arranged to receive light from the above mentioned at least one light source. Said light control film may be a film such as the diffusor polycarbonate film model Lexan® DFS 1329 available from The Konig Film Centre. Alternatively, the light control film may be one or more of a refractive film and a polarizing film.

The blind spot indicator assembly further includes a lens assembly. The lens assembly is adapted to allow light to come out from the blind spot indicator assembly. For this purpose, the lens assembly may comprise at least one lens layer such as for example a transparent lens layer or diffusor. The lens assembly has a light-receiving portion arranged to receive light from the light control film. The lens assembly may comprise at least a light diffuser layer.

The light control film is inclined at an angle, for example 10-70°, to the lens assembly and/or the light control film is positioned such that at least a point of the light control film is spaced apart from the lens assembly by a separation distance. Said separation distance from a point of the light control film to the lens assembly may be 2-6 mm. The light control film may be at least one of a refractive, a polarizing, or a diffusive light control film. The light control film is preferably arranged to project light, such as at least 60-70% of the light received, in a second predetermined direction. Said second predetermined direction extends at an angle to the lens assembly such as, for example, 30-170°.

At least one portion of the light control film is attached to the housing. Preferably, the light control film is attached to the housing through a light control film accommodation area. The light control film accommodation area may extend along a perimeter portion within the housing formed therein, preferably, opposite the light source attaching portion. The perimeter portion may include any portion of the housing interior such as an inner surface, area, or wall thereof.

In one example, the above mentioned first predetermined direction may extend perpendicular to at least one of the light control film and the lens assembly.

In other examples, a light-reflective portion may be formed in an inner surface of the housing. The light-reflective portion of the housing is arranged to receive light from the light source and to reflect it towards the above-mentioned light control film.

In said other examples, one portion of the light from the light source may reflect into the light-reflective portion formed in an inner surface of the housing and another portion of the light from the light source may directly impinge on the light control film.

The present blind spot indicator assembly may further include at least one electronics carrier such as a suitable printed circuit board. In use, the light source is connected to said electronics carrier.

A rear-view minor for a motor vehicle is also disclosed herein comprising a blind spot indicator assembly.

The blind spot indicator assembly comprises a housing, at least one light source arranged to project light along a first predetermined direction, a light control film having at least one surface arranged to receive light from the at least one light source, and a lens assembly having a light-receiving portion arranged to receive light from the light control film. The lens assembly is adapted to allow light to come out from the blind spot indicator assembly. For this purpose, the lens assembly may comprise at least one lens layer such as for example a transparent lens layer or diffusor.

The light control film of the blind spot indicator assembly is inclined at an angle to the glass pane and/or at least a point of the light control film is spaced apart from the lens assembly by a separation distance.

The rear-view mirror further comprises a mirror head that includes a mirror housing, and a glass pane. A mirror plate is provided for attachment of the glass pane to the mirror head. An icon element, such as for example a triangle although many other symbols may be used, even a simple dot, is arranged in optical connection with the light-receiving portion of the lens assembly so as to be illuminated by light received from the blind spot indicator assembly. The icon element acts as a warning indicator such that when a vehicle is detected within the blind spot area, the icon element is illuminated in the rearview mirror. For this purpose, the icon element may be located in a position corresponding to the light-receiving portion of the lens assembly or as an icon of a translucid area of the glass pane, so as to be illuminated by light received from the light control film. When the rear-view mirror is already installed in the vehicle, the main light output direction from the blind spot indicator is directed towards the driver. The icon element may be included in the blind spot indicator assembly, or it may be a transparent area formed by removing at least one portion of the reflective coating material of the glass pane.

The lens assembly is arranged in the blind spot indicator assembly between the light control film and the icon element. When the lens assembly comprises a diffusing lens, the lens assembly also diffuses light received from the light control film to the icon element.

The rear-view mirror may further include a heater attached to the glass pane, and preferably, the mirror plate, and the blind spot indicator assembly through the housing and/or the lens assembly. The heater serves the purpose of providing resistive heat to the glass pane. Said heater may comprises a sheet material with electrical resistance for delivering thermal energy as an electric current flows there through. This results in that a defrosting effect is provided, as well as removal of obstacles and any water-based obstructions that may be attached to the glass pane.

The light output through the lens assembly from the blind spot indicator assembly faces an opening formed in the heater. The light transmissive portion of the glass pane, that is, the icon element, faces that opening of the heater and the light output from the blind spot indicator assembly. Therefore, the icon is in optical connection with the light output through the lens assembly of the blind spot indicator assembly.

The blind spot indicator assembly in the rear-view mirror may be attached to at least one of the glass pane, the heater and the minor plate.

The light control film may be arranged to project light along the second predetermined direction at an angle to the glass pane.

The glass pane may be attached to the back plate by a suitable adhesive and optionally through the heater itself.

The above-described blind spot indicator assembly for motor vehicles has been found to be advantageous and efficient as illumination on users different from the driver can be effectively avoided at a reduced cost.

BRIEF DESCRIPTION OF THE DRAWINGS

Non-limiting examples of the present disclosure will be described in the following, with reference to the appended drawings, in which:

FIG. 6 is a sectional view of the present blind spot indicator assembly, in accordance with a non-limiting example;

FIG. 7 is a sectional view of the blind spot indicator assembly taken along section plane B-B in FIG. 6, in accordance with a non-limiting example; and FIG. 8 is a front view of the blind spot indicator in FIGS. 6 and 7, in accordance with a non-limiting example.

DETAILED DESCRIPTION

Figure 1:
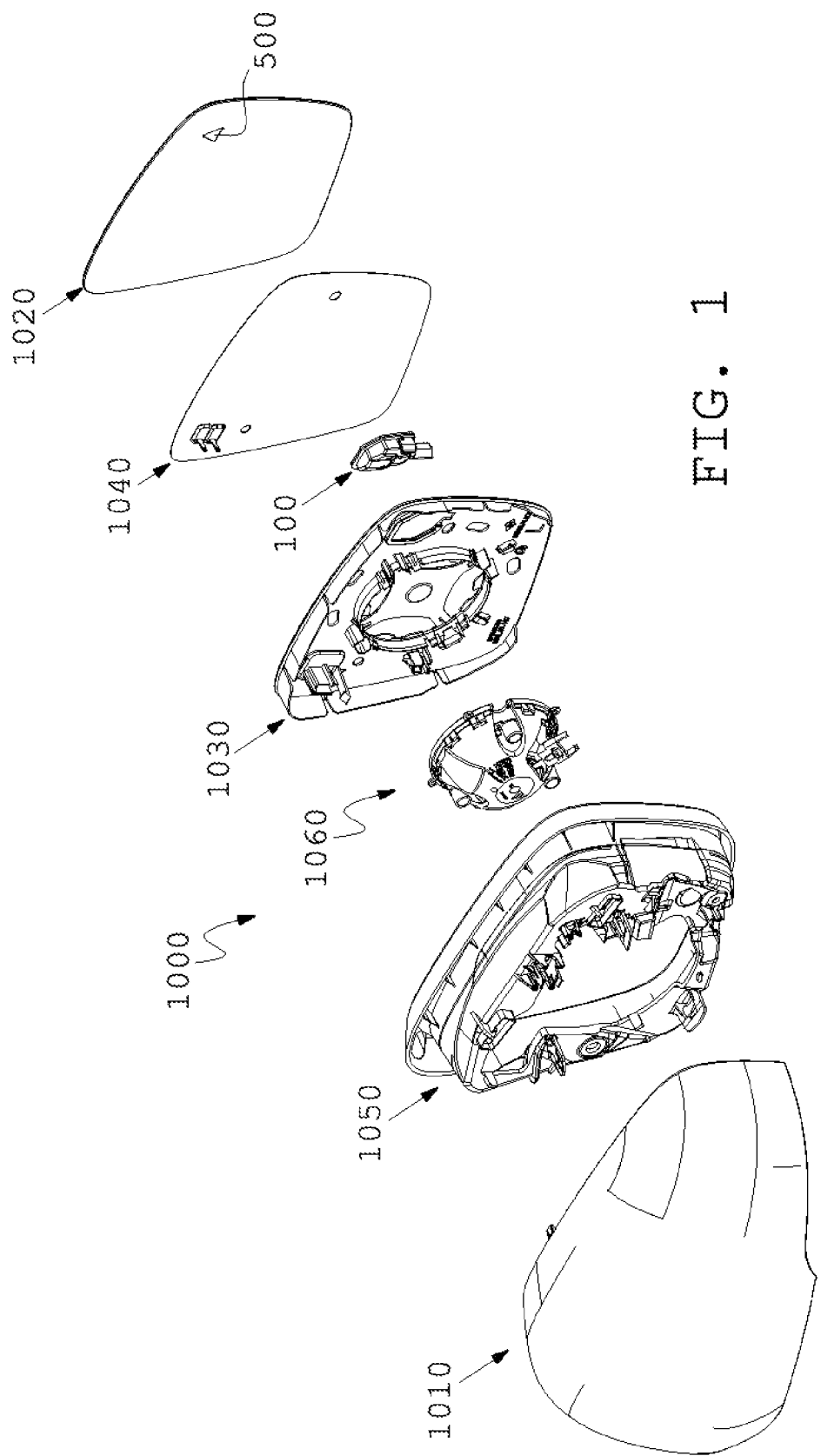
FIG. 1 is a disassembled perspective view of one example of a mirror head of a rear-view mirror for a motor vehicle with the present blind spot indicator assembly, in accordance with a non-limiting example.

In the disassembled perspective view of FIG. 1 of the drawings, one non-limiting example of a mirror head 1000 of a rear-view minor for a motor vehicle is illustrated. The minor head 1000 of a rear-view mirror for a motor vehicle in FIG. 1 is provided with a blind spot indicator assembly 100 that will be described in detail below with reference to FIGS. 1a, 1b, and 2-8 of the drawings.

The minor head 1000 shown in FIG. 1 comprises a mirror housing 1010, a glass pane 1020, a mirror plate 1030 and a minor frame 1050. The glass pane 1020 has therein an icon element 500. The icon element 500 comprises any suitable symbol or text that may be illuminated to alert the driver when a vehicle is within a blind spot area. The icon element 500 may be, for example, a triangle, although many other suitable symbols may be used as a warning indicator.

The icon element 500 is located at a position corresponding to a light-receiving portion 450 of said glass pane 1020, so as to be illuminated by light received the blind spot indicator assembly 100 as it will be described in detail below.

The glass pane 1020 of the mirror head 1000 is attached to the mirror housing through the mirror plate 1030. The glass pane 1020 can be moved to the mirror housing through a glass actuator 1060.

A heater 1040 is attached to the glass pane 1020 and/or the mirror plate 1030 of the mirror head 1000. In the example shown, the glass pane 1020 is attached to the mirror plate 1030 and optionally through the above-mentioned heater 1040 by means of a suitable adhesive. The heater 1040 is intended for resistive heating of the above-mentioned glass pane 1020. For this purpose, the heater 1040 comprises a sheet material with electrical resistance for delivering thermal energy as an electric current flows there through. This results in a defrosting effect, as well as removal of obstacles and any water-based obstructions that may be attached to the above-mentioned glass pane 1020.

As stated above, mirror head 1000 shown in FIG. 1 further comprises a blind spot indicator assembly 100 which is shown in detail in FIGS. 1a, 1b, and 2-8 of the drawings. The blind spot indicator assembly 100 is configured for warning of the presence of another vehicle or object that has been detected to be within a blind spot area.

In the present example, the blind spot indicator assembly 100 is attached directly to the glass pane 1020 of the minor head 1000 through the heater 1040 that comprises two opposite adhesive layers, the first one for being attached to the mirror pane 1020, and the second one for being attached to the back plate 1030 and the blind spot indicator assembly 100. In general, the blind spot indicator assembly 100 is attached to at least one of the glass pane 1020, the heater 1040 and the mirror plate 1030 of the mirror head 1000.

The blind spot indicator assembly 100 comprises a housing 110. The heater 1040 of the minor head 1000 may be attached to said housing 110 of the blind spot indicator assembly 100 or even to a lens assembly 400 of the blind spot indicator assembly 100. Light output from the blind spot indicator assembly 100 through the lens assembly 400 faces an opening formed in the heater 1040. A light transmissive portion of the glass pane 1020 that is at least part of the above-mentioned icon element 500 faces that opening of the heater 1040 so that light output from the blind spot indicator assembly 100 illuminates the icon element 500 when an object or vehicle is within a blind spot area. Therefore, the icon 500 is optical connected to the blind spot indicator assembly 1000 lens assembly 400.

A light source 200 is attached to a light source attaching portion 115 within the housing 110. In the examples of FIGS. 1a, 2, 3, 4 and 5 of the drawings, the light source 200 includes a light emitting diode 250 that is connected to an electronics carrier 700 such as a PCB. Other configurations are possible such as the one illustrated in FIG. 1b where the light source 200 includes two light emitting diodes, LEDs, 250, connected to the PCB 700. In general, there should be as many LEDs 250 and PCBs 700 as required.

Figure 4:
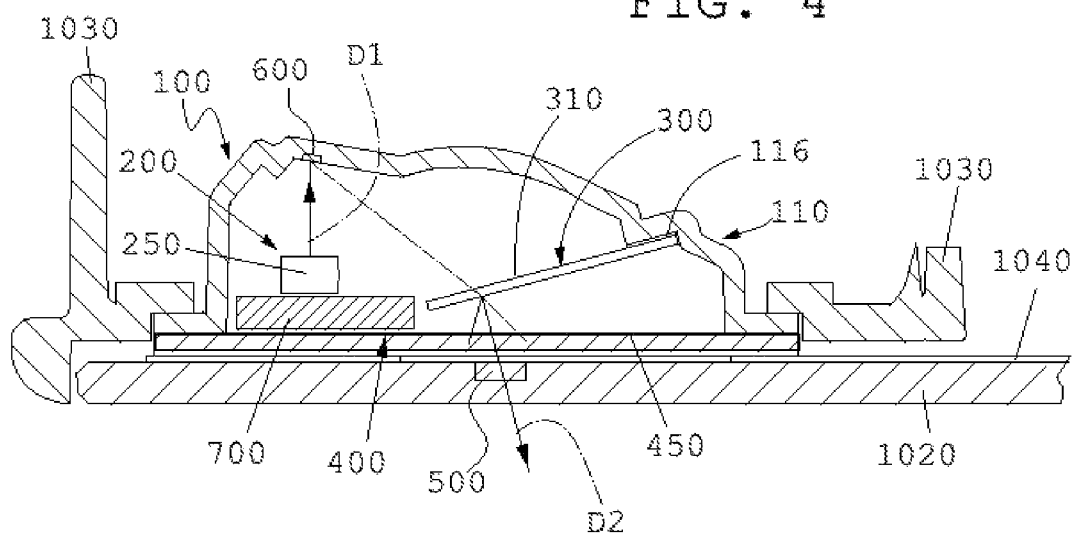
FIG. 4 is a sectional view of a fifth example of the present blind spot indicator assembly where a light source is arranged to emit light along a direction perpendicular to and away from the lens assembly towards a light-reflective portion formed in an inner surface of the housing, to be reflected towards a light control film, in accordance with a non-limiting example.

In any case, the light source 200 is arranged to project light along a first predetermined direction D1 upon detection of an approaching object, such as for example another vehicle, within a blind spot or blind area. In the example of FIGS. 2 and 4, the first predetermined direction D1 along which the light source 200 emits light is perpendicular to the above-mentioned lens assembly 400 of the blind spot indicator assembly 100. The light source 200 may be arranged in other different positions so that light is emitted along the first predetermined direction D1 at other angles to the lens assembly 400 as shown in FIGS. 1a, 1b, 3, and 5 of the drawings.

A light control film 300 is provided. The light control film 300 has at least one receiving surface 310 arranged to receive light from the light source 200. In that example, the light control film 300 has diffusive characteristics, diffusing the light received by the light source 200 towards the lens assembly 400. The light control film 300 may be one or more of a refractive light control film, a polarizing light control film, and a diffusive light control film.

As mentioned above, the blind spot indicator assembly 100 is also provided with the lens assembly 400. Said lens assembly 400 has a light-receiving portion 450 that is arranged to receive light from the above-mentioned light control film 300. The lens assembly 400 comprises at least a light diffuser layer. The lens assembly 400 is located between the light control film 300 and the icon element 500 to diffuse light received from the light control film 300 to the icon element 500 through its light diffuser layer.

Light from light source 200 may be emitted directly or indirectly onto the receiving surface 310 of the light control film 300. The light source 200 may be arranged in different positions. For example, in the case illustrated in FIG. 3 of the drawings, the light source 200 is arranged so that light is emitted along the first predetermined direction D1 substantially perpendicular to the light control film 300. Other arrangements are possible for the positioning of the light source 200 relative to the light control film 300.

As the light source 200 emits light along the above mentioned first predetermined direction D1 directly or indirectly striking the light control film 300, at least 60% and more preferably, at least 70% of the light is then projected along a second predetermined direction D2. The second predetermined direction D2 corresponds to a main direction of output light from the blind spot indicator assembly 100. The second predetermined direction D2 extends at an angle α2 with respect to the lens assembly 400, or the glass pane 1020. The angle of inclination α2 of the second predetermined direction D2 may be of 30°-170° although other values may be possible. The direction of the light exiting the blind spot indicator assembly 100 corresponds to the second predetermined direction D2, different from the first predetermined direction D1 of the light emitted from the light source 200.

Figure 1A:
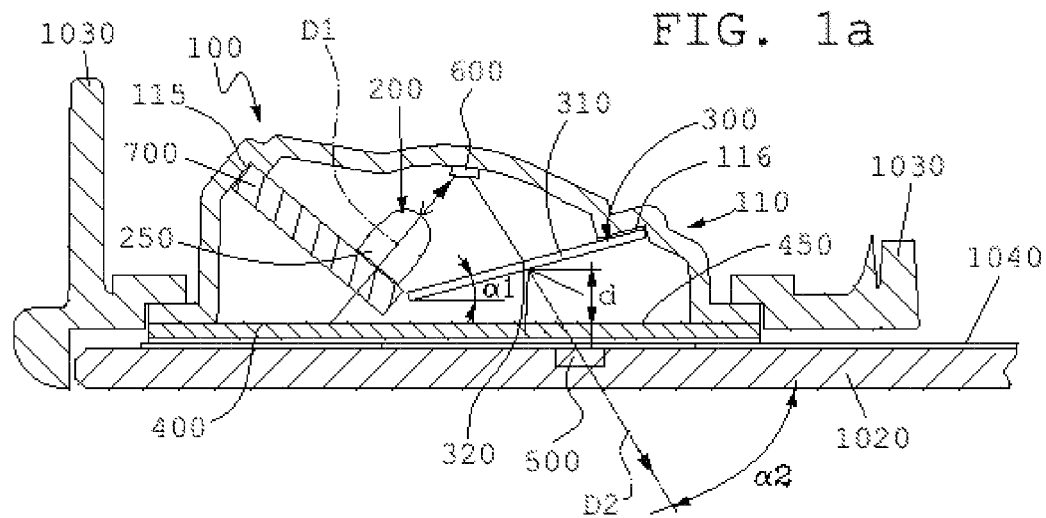
FIG. 1a is a sectional view of a first example of the present blind spot indicator assembly where a light source is arranged to emit light towards a light-reflective portion formed in an inner surface of the housing of the blind spot indicator assembly to be reflected towards a light control film, in accordance with a non-limiting example.
Figure 2:
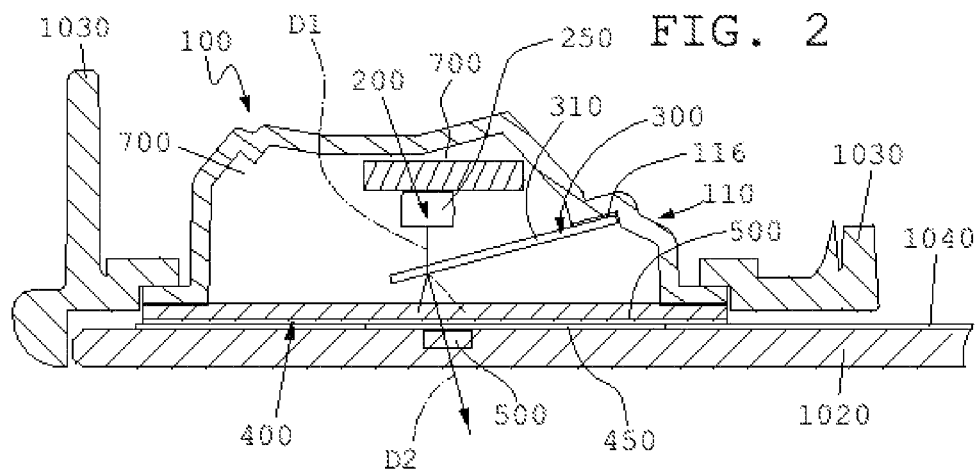
FIG. 2 is a sectional view of a third example of the present blind spot indicator assembly light where no light-reflective portion is provided within the housing such that a light source is arranged to emit light directly to a light control film along a direction perpendicular to the lens assembly, in accordance with a non-limiting example.
Figure 3:
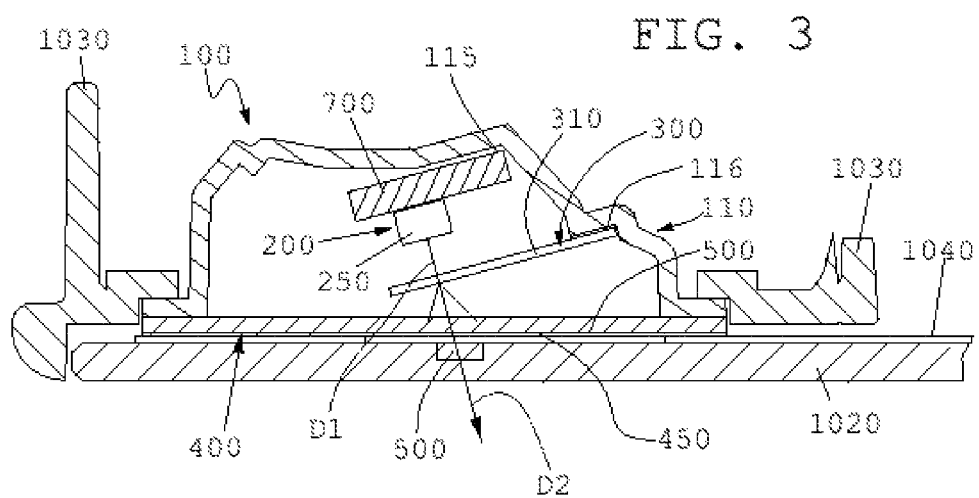
FIG. 3 is a sectional view of a fourth example of the present blind spot indicator assembly where again no light-reflective portion is provided within the housing such that and a light source is arranged to emit light directly to a light control film along a direction at an angle to the lens assembly, in accordance with a non-limiting example.

In use, with the rear-view mirror 1000 already installed in the vehicle, the second predetermined direction D2 is directed towards the driver such that light on users different from the driver is advantageously avoided in an efficient manner In the example shown in FIG. 1a of the drawings, the light control film 300 is inclined with respect to the lens assembly 400. Specifically in the example shown in the drawings, the light control film 300 is inclined at angle α1 of 10°-70° with respect to the lens assembly 400.

Alternatively or additionally, the positioning of the light control film 300 may be defined through a separation distance d from at least one point, such as mid-point 320 in the light control film 300, as illustrated in FIG. 1a, to the lens assembly 400. Said separation distance d may be for example 2-6 mm. Positioning of the light control film 300 spaced from the lens assembly 400 allows suitable pretreating of the light before reaching the lens assembly 400 resulting in final characteristics of light beams to be optimally improved at the output of the blind spot indicator assembly 100 towards the icon element 500 in the rear-view mirror 1000.

Figure 1B:
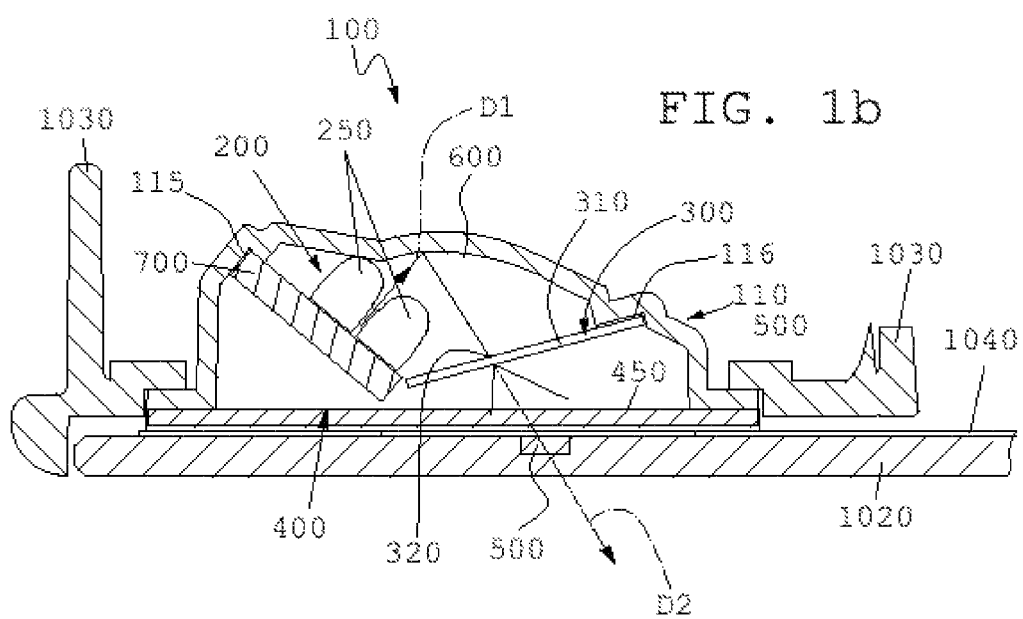
FIG. 1b is a sectional view of a second example of the present blind spot indicator assembly corresponding to the example shown in FIG. 1a but using a light source including two light emitting diodes arranged to emit light towards a light-reflective portion formed in an inner surface of the housing of the blind spot indicator assembly to be reflected towards a light control film, in accordance with a non-limiting example.

In the particular case illustrated in FIGS. 1a, 1b and 4, light is emitted along the first predetermined direction D1 towards a light-reflective portion 600 that is formed in an inner surface of the housing 110. Said light-reflective portion 600 is arranged to receive light from the LED(s) 250 and to reflect towards the receiving surface 310 of the light control film 300.

Figure 5:
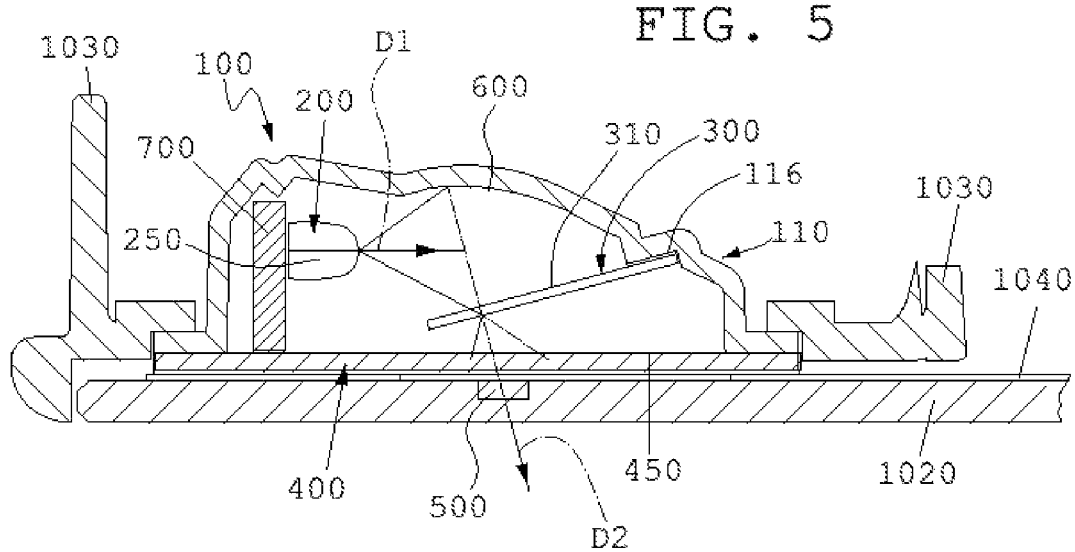
FIG. 5 is a sectional view of a sixth example of the present blind spot indicator assembly where a light source is arranged to emit light such that one portion of the emitted light is reflected towards a light-reflective portion in an inner surface of the housing and another portion of the light directly impinges on a light control film, in accordance with a non-limiting example.

In the case shown in FIG. 5 of the drawings, the PCB 700 is arranged in a substantially vertical position such that one portion of the emitted light from the light source 200 is reflected towards the light-reflective portion 600 and another portion of the light from the light source 200 directly impinges on the receiving surface 310 of the light control film 300.

At least one portion of the light control film 300 is attached to the housing 110 through a light control film accommodation area 116. Said light control film accommodation area 116 extends along a perimeter portion within the housing 110. Within the housing 110, the light source attaching portion 115 is located facing the light control film accommodation area 116, as shown in FIGS. 1a, 1b, 4, and 5 of the drawings. However, other different arrangements are possible such as the ones illustrated in the examples shown in FIGS. 2 and 3.

Although several examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

What is claimed is:

1. A blind spot indicator assembly (100) for a motor vehicle, the assembly (100) comprising:
    a housing (110);
    at least one light source (200) arranged to project light along a first predetermined direction (D1);
    a light control film (300) having at least one surface (310) arranged to receive light from the at least one light source (200); and
    a lens assembly (400) having a light-receiving portion (450) arranged to receive light from the light control film (300);
    wherein the light control film (300) is inclined at an angle (α1) to the lens assembly (400) and/or at least a point of the light control film (300) is spaced apart from the lens assembly (400) by a separation distance (d);
    wherein a light-reflective portion (600) is formed in an inner surface of the housing (110) arranged to receive light from the light source (200) and to reflect it towards the light control film (300).

2. The assembly (100) according to claim 1, wherein the separation distance (d) from a point of the light control film (300) to the lens assembly (400) is 2-6 mm.

3. The assembly (100) according to claim 1, wherein the light control film (300) is inclined at an angle (α1) of 10-70° to the lens assembly (400).

4. The assembly (100) according to claim 1, wherein the light control film (300) is arranged to project light in a second predetermined direction (D2) at an angle (α2) to the lens assembly (400).

5. The assembly (100) according to claim 4, wherein the angle (α2) of the second predetermined direction (D2) to the lens assembly (400) is 30-170°.

6. The assembly (100) according to claim 1, wherein the light source (200) is attached to a light source attaching portion (116) within the housing (110).

7. The assembly (100) according to claim 1, wherein at least one portion of the light control film (300) is attached to the housing (110).

8. The assembly (100) according to claim 7, wherein the light control film (300) is attached to the housing (110) through a light control film accommodation area (115) extending along a perimeter portion within the housing (110) formed opposite the light source attaching portion (116).

9. The assembly according to claim 1, wherein the first predetermined direction (D1) is perpendicular to at least one of the light control film (300) and the lens assembly (400).

10. The assembly according to claim 1, wherein one portion of the light from the light source (200) reflects into the light-reflective portion (600) formed in an inner surface of the housing (110) and another portion of the light from the light source (200) directly impinges on the light control film (300).

11. A rear-view mirror for a motor vehicle comprising:
    a blind spot indicator assembly (100) including:
        a housing (110);
        at least one light source (200) arranged to project light along a first predetermined direction (D1);
        a light control film (300) having at least one surface (310) arranged to receive light from the at least one light source (200); and
        a lens assembly (400) having a light-receiving portion (450) arranged to receive light from the light control film (300); and
    a mirror head (1000) that includes a mirror housing (1010), a glass pane (1020), a mirror plate (1030) for attachment of the glass pane (1020) to the mirror head (1000), and an icon element (500) arranged in optical connection with the light-receiving portion (450) of the lens assembly (400) so as to be illuminated by light received from the blind spot indicator assembly (100)
    wherein a light-reflective portion (600) is formed in an inner surface of the housing (110) arranged to receive light from the light source (200) and to reflect it towards the light control film (300).

12. The rear-view mirror according to claim 11, wherein the lens assembly (400) is arranged between the light control film (300) and the icon element (500) to diffuse light received from the light control film (300) to the icon element (500).

13. The rear-view mirror according to claim 11, wherein the light control film (300) is arranged to project light in the second predetermined direction (D2) at an angle (α2) to the glass pane (1020).

14. The rear-view mirror according to claim 11, wherein it further includes a heater (1040) attached to at least one of the glass pane (1020), the mirror plate (1030), and the housing (110) of the blind spot indicator assembly (100).

* * * * *